United States Patent [19]

Miwa et al.

[11] Patent Number: 4,731,409

[45] Date of Patent: Mar. 15, 1988

[54] AQUEOUS COATING COMPOSITION CONTAINING FINE PARTICLES OF WATER INSOLUBLE RESIN SOLUTION

[75] Inventors: Hiroshi Miwa; Hideyoshi Noda, both of Hyogo; Sakuichi Konishi, Nara, all of Japan

[73] Assignee: Nippon Paint Co., Ltd., Osaka, Japan

[21] Appl. No.: 11,211

[22] Filed: Feb. 3, 1987

[30] Foreign Application Priority Data

Feb. 5, 1986 [JP] Japan .................................. 61-023330

[51] Int. Cl.$^4$ ...................... C08L 63/00; C08L 33/02
[52] U.S. Cl. ................................. 524/501; 524/460; 524/458; 524/504; 524/510; 524/512; 524/515; 524/522; 524/513; 523/402
[58] Field of Search ............... 524/501, 457, 503, 523; 523/501, 502, 409

[56] References Cited

U.S. PATENT DOCUMENTS

| | | | |
|---|---|---|---|
| 4,504,609 | 3/1985 | Kuwajima et al. | 523/501 |
| 4,510,275 | 4/1985 | Ihikura et al. | 523/412 |
| 4,518,724 | 5/1985 | Kuwajima et al. | 523/501 |
| 4,624,973 | 11/1986 | Kuwajima et al. | 523/221 |

*Primary Examiner*—Joseph L. Schofer
*Assistant Examiner*—Angela L. Fugo
*Attorney, Agent, or Firm*—Wenderoth, Lind & Ponack

[57] ABSTRACT

An aqueous coating composition comprising (A) an aqueous medium, (B) at least one water soluble or dilutable resin which has a water tolerance of 4 or more and whose 1% by weight aqueous solution shows a surface tension of 51 dyne/cm or less, and (C) fine particles of resinous solution of water insoluble resin in a hydrophobic solvent, the particles being uniformly dispersed in the combination of said aqueous medium (A) and the water soluble or dilutable resin (B) and having a mean diameter of $1\mu$ or less, which is characterized in that the absolute value of difference in solubility parameter ($|\Delta Sp|$) between said resinous solution and said water soluble or dilutable resin is within a range of $|\Delta Sp|<2$.

The present coating composition is excellent in storage stability and application characteristics, resulting a coating with excellent gloss and surface smoothness.

5 Claims, No Drawings

AQUEOUS COATING COMPOSITION CONTAINING FINE PARTICLES OF WATER INSOLUBLE RESIN SOLUTION

FIELD OF THE INVENTION

The present invention relates to an aqueous coating composition and more specifically an aqueous coating composition containing fine particles of water insoluble resin solution, which is excellent in application characteristics, capable of resulting a coating with improved gloss and surface smoothness and is specifically useful as a top coat for automobile bodies and the like.

BACKGROUND OF THE INVENTION

An aqueous coating composition comprising an aqueous medium and a water soluble or dilutable resin (sometimes called aqueous resin) and containing in the form of dispersion a hydrophobic resin has been watched with keen interest in paint industries because of the characteristics of being free from air pollution, fire hazard and the like and minimizing the amount of expensive and harmful organic solvent required. Furthermore, in this type of composition, it is able to use a number of combinations of various resins which can develop the characteristics of the respective resins used.

However, in the heretofore proposed aqueous coating compositions containing in the form of dispersion a hydrophobic resin, dispersion particles are in general of relatively large size and when applied, the formed coatings are rather poor in gloss and it is hardly possible to attain the desired level of specular gloss (60°) of 90 or more. Furthermore, since there is a marked tendency of making agglomerates among the dispersed resin particles themselves or in the case of a colored coating composition, among the resin particles themselves as well as between the resin particle and the coexisting pigment particle, causing sediments which are hardly redispersible in the compositions, there are problems awaiting solution in the stability of the coating compositions and in the application characteristics thereof. For these reasons, such compositions have scarcely been used as a top coat for automobile bodies and household electric appliances, requiring a high gloss and surface smoothness.

To cope with the same, a thermosetting aqueous coating composition obtained by the reaction of a composition comprising (A) a water insoluble acrylic resin having an acid value of 0 to 15 and a hydroxyl value of 30 to 300, (B) a water soluble or dispersible acrylic resin having an acid value of 15 to 30 and a hydroxyl value of 30 to 300, and (C) an aminoplast resin and/or pheno-formaldehdye resin, the solid weight ratio of A/B being 20/80 to 80/20 and the solid weight ratio of A+B/C being 60/40 to 95/5, with an amount of basic compound which is sufficient enough to neutralize 80 to 100 mol% of the total carboxyl groups of the composition had been proposed in Japanese Patent Application Kokai No. 164145/82. It was reported that a highly glossy coating with specular gloss (60°) of 90 or more was obtained and excellent stability of coating composition and improved application characteristics were realized.

However, in that invention, both of the water soluble resin and water insoluble resin are limited to particular type acrylic resins. In fact, the inventors of said patent application said that for the attainment of stability of composition and coating appearance, the acid value of the water soluble resin had to be limited to a lower value of 15 to 30, which was far below the level being believed to be appropriate to water soluble resins for coating use. Thus, in the invention of Japanese Patent Application Kokai No. 164145/82, particular acrylic resins are used as water soluble resin and water insoluble resin, respectively, and moreover, solubility of the water soluble resin is limited for the obtainment of improved stability of the coating composition and coating gloss. Nevertheless the actual effects are not fully satisfactory and further improvements are still needed.

As a separate approach, a method was proposed for preparing a resinous dispersion for coating use in Japanese Patent Publication No. 49230/85, wherein water soluble resin, water insoluble resin and water were stirred well in a mixer having a crushing function and then thus obtained emulsion was further treated in a bell type non-driven mixer. In that publication, a statement is given to the effect that though the water soluble resin and the water insoluble resin may be each 100% solid content, a small quantity of hydrophilic organic solvent may be contained in the respective resin for the facility of smooth operation. However, the present inventors have found that when a hydrophilic organic solvent is present in the said composition, there is an undesirable lowering in dispersion stability, causing an inferior storage stability and application characteristics of the composition resulting in a coating which is insufficient in gloss and surface smoothness.

It is, therefore, an object of the invention to provide an aqueous coating composition comprising a water soluble or dilutable resin selected from a wider range of polymers, a water insoluble resin selected from a wider range of polymers, and water, which composition is excellent in storage stability and application characteristics and results in a coating with excellent gloss and surface smoothness. An additional object of the invention is to provide an aqueous coating composition with the aforesaid characteristics, which is formulatable in a simple and easy way and is specifically useful as a top coat for automobile bodies, household electric appliances and the like.

The other objects of the invention shall be clear from the description of the specification and accompanying claims.

SUMMARY OF THE INVENTION

According to the invention, the aforesaid objects can be attained with an aqueous coating composition comprising (A) an aqueous medium, (B) at least one water soluble or dilutable resin which has a water tolerance hereinunder defined as 4 or more and whose 1% by weight aqueous solution shows a surface tension of 51 dyne/cm or less, and (C) fine particles of a resinous solution of water insoluble resin in a hydrophobic solvent, the particles being uniformly dispersed in the combination of said aqueous medium (A) and the water soluble or dilutable resin (B) and having a mean diameter of $1\mu$ or less, which is characterized by the absolute value of difference in solubility parameter ($|\Delta Sp|$) between said resinous solution and said water soluble or dilutable resin as being within a range of $|\Delta Sp| < 2$.

PREFERRED EMBODIMENTS OF THE INVENTION

The water soluble or dilutable resin used in the present invention may be any known member selected from acrylic resin, oil-free polyester resin, alkyd resin, epoxy resin, urethane resin, aminoplast resin, maleinized oil and the like and characterized by the specific water tolerance and surface tension value hereunder defined.

That is, the present water soluble or dilutable resin must fulfill the requirements of water tolerance determined by the following test is 4 or more and surface tension of 1% by weight aqueous solution is 51 dyne/cm or less.

In the determination of water tolerance of a resin, 5 g of aqueous resin varnish having a common viscosity for use in the prepartion of aqueous coating compositions are weighed in a 100 ml glass beaker, an increasing amount of deionized water is added thereto until No. 1 printing type (26 point type) cannot be read through the beaker, and water tolerance of the test resin is determined and expressed in terms of water dilution ratio at that stage.

The inventors have found that when the aforesaid water tolerance of a water soluble or dilutable resin is less than 4, there is a marked tendency that viscosity of the aqueous resin composition added with a water insoluble resin be undesirably increased and dispersion stability of said water insoluble resin in the composition be lowered.

The similar tendency has likewise been observed at the time when the surface tension of 1% by weight aqueous resin solution exceeds over the limit of 51 dyne/cm.

Therefore, the present water soluble or dilutable resin should have the characteristics that water tolerance is 4 or more and surface tension of 1% by weight aqueous solution is 51 dyne/cm or less.

In this invention, when the water soluble or dilutable resin is of anionic nature such as acrylic resin, alkyd resin and the like, it is neutralized with a basic compound and when it is of cationic nature such as acrylic resin, urethane resin, aminoplast resin and the like, it is neutralized with an acidic compound to dissolve or disperse the resin in an aqueous medium.

Differing from the invention of the aforesaid Japanese Patent Application Kokai No. 164145/82, the water soluble or dispersible resin may be selected from a variety of polymers and it is preferred to use an anionic resin having an acid value of 30 to 200 and most preferably 30 to 100, or a cationic resin having 30 to 200 m mol nitrogen atoms per 100 g resinous solid.

In this invention, in the combination system of an aqueous medium and the abovesaid water soluble or dilutable resin, are included, in the form of stabilized dispserion, fine particles of resinous solution comprising a water insoluble resin diluted with or dissolved in a hydrophobic organic solvent.

As the water insoluble resin, any of the known polymers may be satisfactorily used providing being soluble or dilutable with a hydrophobic organic solvent.

They are usually liquid or solid polymers having an acid value of 10 or less. Examples of such polymers are acrylic resin, oil-free polyester resin, alkyd resin, epoxy resin, aminoplast resin, acryl modified alkyd resin, acryl modified polyester resin and the like.

The present water insoluble resinous solution may further include in the form of solution or dispersion, pigment, crosslinking agent, catalyst, dyestuff, plasticizer and other coating additives as desired.

The said resinous solution is present in the combination system of an aqueous medium and water soluble or dilutable resin, in the form of fine liquid particles with a mean diameter of $1\mu$ or less.

Such a dispersion may be easily obtained by mixing an aqueous medium, a water soluble or dilutable resin and a solution of water insoluble resin in a hydrophobic organic solvent in a conventional mixer at an usual mixing temperature of 35° to 95° C. For example, said mixing may be carried out with a Laboratory mixer in about 15 minutes or more.

Thus, in the present invention, an extremely stabilized dispersion of fine liquid particles can be easily obtained with a simple mixing operation, which must be said to be a quite surprising finding seeing from the technical level concerned.

This must be a natural consequence of adopting a specific water soluble or dilutable resin having an excellent emulsifying function and a solution of water insoluble resin in a hydrophobic organic solvent.

In regard to the compatibility of water soluble or dilutable resin and water insoluble resin, the inventors have found that the absolute value of difference in solubility parameter ($|\Delta Sp|$) between said resinous solution and said water soluble or dilutable resin should be in a range of $|\Delta Sp| < 2$, for the obtainment of stabilized dispersion of fine liquid particles with a mean diameter of 0.1 to $1\mu$. If the said value ($|\Delta Sp|$) is 2 or more, it is difficult to obtain the desired stabilized dispersion of fine liquid particles and the resulting composition is poor in storage stability and can only give a coating with inferior gloss. The present coating composition is quite stable even when stored at 40° C. for 1 month or more and is excellent in application characteristics. Moreover, the present coating composition can produce a coating with higher gloss, i.e. 20° specular gloss of 80 or more, 60° specular gloss of 90 or more, and improved surface smoothness, and hence, is very useful as a top coat for automobile bodies, household electric appliances and the like.

The invention shall be now more fully explained in the following Examples. Unless otherwise being stated, all parts and % are by weight.

In these Examples, the following materials are used.

(1) Water insoluble resin solution (water insoluble resin diluted or dissolved in hydrophobic organic solvent):

A. A solution of acrylic resin (OH value 40, Tg 30° C., number average molecular weight 4000) in Solvesso 150 (trademark, Esso Petroleum) (solid content 80%) Sp=9.20

B. A mixture of 100 parts of said A solution and 20 parts of Cymel 303 (melamine-formaldehyde resin, trademark, Mitsui Cyanamide Co.) Sp=10.0

B'. A mixture of 120 parts of said B, 100 parts of titanium dioxide and 150 parts of Cellosolve acetate Sp=9.80

C. A mixture of 100 parts of a solution of alkyd resin (OH value 60, acid value 10 and number average molecular weight 1700) in xylene (solid content 85%), and 50 parts of butylated melamine. SP=10.0

(2) or (4) Aqueous resin varnish (water soluble or dilutable resin varnish):

I. 100 parts of a solution of acrylic resin (acid value 60, hydroxyl value 50, and number average molecular weight 3900) in ethyl Cellosolve (solid content 80% by weight) are added with 6.3 parts of dimethyl ethanolamine and 220 parts of water and the mixture is stirred well to obtain an aqueous resin varnish (I) of neutralization rate of 80%. Sp=11.0 (measured by turbidity test method)

II. 100 parts of a solution of alkyd resin (acid value 35, hydroxyl value 80 and number average molecular weight 1700) in butyl Cellosolve (solid content 80% by weight) are added with 5.8 parts of dimethyl ethanolamine and 220 parts of water and the mixture is stirred in a Laboratory mixer at a room temperature for 15 minutes to obtain an aqueous resin varnish (II) having a neutralization rate of 80%. Non-volatile content of said varnish is 25%. Sp=10.5

III. An acrylic resin neutralized (100%) with an acetic acid, containing 96 m mol N atoms per 100 gram solid and having a number average molecular weight 5000. The varnish has a solid content of 25% by weight. Sp=10.7

IV. 100 parts of a solution of acrylic resin (acid value 70, hydroxyl value 100 and number average molecular weight 5200) in butyl Cellosolve (solid content 80% by weight) are added with 9.0 parts of dimethyl ethanolamine and 220 parts of water and the mixture is stirred to obtain an aqueous resin varnish (IV). Sp=11.5

(3) Pigment: Tipaque R-930 melamine resin, so as to give the weight ratio of (1), (2), (3), (4) and melamine resin as indicated in Table 1, at a room temperature.

COMPARATIVE EXAMPLE 1

A comparative coating composition was prepared by using the materials shown in Table 1 and following the procedures of Example 1. However, in this experiment, pasty product was prepared by grinding the premix of aqueous resin varnish (2) and water insoluble resin solution (1) in a Laboratory mixer at 60° C. for 5 minutes. The mean diameter of the water insoluble resin solution particles was $5.3\mu$.

COMPARATIVE EXAMPLE 2

A comparative coating composition was prepared by using the materials shown in Table 1 and following the procedures of Example 1. In this experiment, $|\Delta Sp|$ was 2.30 which was outside the scope of this invetion.

Each of the coating compositions obtained in Examples 1 to 5 and Comparative Examples 1 to 2 was diluted with deionized water to #4 Ford cup viscosity of 30 seconds, and thus diluted composition was applied on a steel plate by spraying. After setting for 5 minutes, the coated plate was baked at 150° C. for 15 minutes to obtain a crosslinked polymer coating. 60° specular gloss and 20° specular gloss of thus obtained coating are shown in Table 1. This table also shows stability of each coating composition, as well as a mean diameter of resinous solution particles contained.

TABLE 5

|  | Example |  |  |  |  | Comparative Example |  |
|---|---|---|---|---|---|---|---|
|  | 1 | 2 | 3 | 4 | 5 | 1 | 2 |
| Pasty product |  |  |  |  |  |  |  |
| (1) water insoluble resin solution | A | B | B' | C | B | A | A |
| (2) aqueous resin varnish | I | I | I | II | III | I | IV |
| Pigment paste |  |  |  |  |  |  |  |
| (3) pigment | Tipaque R-930 | Tipaque R-930 | — | Tipaque R-930 | Tipaque R-930 | Tipaque R-930 | Tipaque R-930 |
| (4) aqueous resin varnish | I | I | II | II | III | I | IV |
| Compounding ratio |  |  |  |  |  |  |  |
| (1) | 25 (20)* | 30 | 75 | 60 | 30 | 25 | 25 |
| (2) | 80 (20)* | 80 (20)* | 80 (20)* | 80 | 80 | 80 | 80 |
| (3) | 50 | 50 | — | 60 | 50 | 50 | 50 |
| (4) | 80 (20)* | 80 (20)* | 80 (20)* | 80 (20)* | 80 | 80 | 80 |
| melamine resin | Cymel 303 20 | Cymel 303 5 | Cymel 303 20 | Cymel 303 25 | blocked isocyanate 20 | Cymel 303 20 | Cymel 303 20 |
| $|\Delta Sp|$ | 1.80 | 1.0 | 1.20 | 0.5 | 0.7 | 1.80 | 2.30 |
| mean diameter of particles of water insoluble resin solution ($\mu$) | 0.2 | 0.2 | 0.3 | 0.15 | 0.2 | 5.3 | 12 |
| gloss (60°/20°) | 91.0/83 | 93.0/84 | 95/86 | 92/83 | 92/83 | 65/43 | 36/12 |
| stability |  |  |  |  |  |  |  |
| 40° C. × 10 days | excellent | excellent | excellent | excellent | excellent | small lumps | separation |
| 40° C. × 30 days | excellent | excellent | excellent | excellent | excellent | separation | separation |

*solid content

EXAMPLES 1 TO 5

(a) Preparation of pigment paste:

Each pigment paste was prepared by pre-mixing aqueous resin varnish (4), pigment (3) and deionized water each in the weight ratio indicated in Table 1 and grinding the same in a paint conditioner with glass beads at a room temperature for 40 minutes.

(b) Preparation of pasty product:

Pasty product was prepared by pre-mixing aqueous resin varnish (2) and water insoluble resin solution (1) as indicated in Table 1 and grinding the same in a Laboratory mixer at 60° C. for 30 minutes.

(c) Preparation of coating composition:

Each coating composition was prepared by mixing and stirring said pasty product, said pigment paste and

What is claimed is:

1. An aqueous coating composition comprising
(A) an aqueous medium,
(B) at least one water soluble or dilutable resin which has a water tolerance of 4 or more and whose 1% by weight aqueous solution shows a surface tension of 51 dynes/cm or less, and
(C) fine particles of resinous solution of water insoluble resin in a hydrophobic solvent, the particles being uniformly dispersed in the combination of said aqueous medium (A) and the water soluble or dilutable resin (B) and having a mean diameter of $1\mu$ or less, which is characterized in that the absolute value of difference in solubility parameter ($|\Delta Sp|$) between said resinous solution and said water soluble or dilutable resin is within a range of $|\Delta Sp| < 2$.

2. A composition according to claim 1, wherein the water insoluble resin is selected from the group consisting of acrylic resin, oil-free polyester resin, alkyd resin, epoxy resin, aminoplast resin, acryl modified alkyd resin, acryl modified polyester resin, and has an acid value of 0 to 10.

3. A composition according to claim 1, wherein the water soluble or dilutable resin is an anionic resin having an acid value of 30 to 200 neutralized with a basic compound.

4. A composition according to claim 1, wherein the water soluble or dilutable resin is a cationic resin having 30 to 300 m mol nitrogen atoms per 100 g resinous solid, neutralized with an acidic compound.

5. A composition according to claim 1 wherein the water soluble or dilutible resin is selected from the group consisting of an anionic resin having an acid value of 30 to 200 neutralized with a basic compound and a cationic resin having 30 to 300 m mol nitrogen atoms per 100 g resinous solid, neutralized with an acidic compound and wherein the water insoluble resin is selected from the group consisting of an acrylic resin, an oil-free polyester resin, an alkyd resin, epoxy resin, an aminoplast resin, an acrylic modified alkyd resin, and an acryl modified polyester resin, and has an acid value of 0 to 10.

* * * * *